(12) United States Patent
Kim et al.

(10) Patent No.: US 7,362,360 B2
(45) Date of Patent: Apr. 22, 2008

(54) DIGITAL CAMERA AND METHOD FOR SAVING DIGITAL IMAGE

(75) Inventors: Yong-gi Kim, Seongnam-si (KR); Seon-mi Lee, Seongnam-si (KR); Sung-cheol Bae, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 725 days.

(21) Appl. No.: 10/699,482

(22) Filed: Oct. 31, 2003

(65) Prior Publication Data

US 2004/0090539 A1    May 13, 2004

(30) Foreign Application Priority Data

Nov. 1, 2002    (KR) .................. 10-2002-0067394

(51) Int. Cl.
H04N 5/76    (2006.01)

(52) U.S. Cl. .................. 348/231.2; 348/231.99

(58) Field of Classification Search ............ 348/231.1, 348/231.99, 231.2, 231.3, 231.4, 231.5, 231.6, 348/231.7, 231.8, 231.9
See application file for complete search history.

(56) References Cited

U.S. PATENT DOCUMENTS 6,429,896 B1 *  8/2002  Aruga et al. ........... 348/231.99
6,539,169 B1 *  3/2003  Tsubaki et al. ............. 386/109
6,813,312 B2 * 11/2004  Tullberg et al. ........ 375/240.01
6,885,395 B1 *  4/2005  Rabbani et al. .......... 348/231.1
6,999,626 B2 *  2/2006  Andrew ..................... 382/235
7,123,295 B2 * 10/2006  Baron et al. ............. 348/231.2
2002/0097326 A1 *  7/2002  Kuroiwa ..................... 348/231
2002/0109780 A1 *  8/2002  Kaku .................... 348/231.99
2004/0075750 A1 *  4/2004  Bateman .................. 348/231.1

FOREIGN PATENT DOCUMENTS

JP    03-240384 A    10/1991
KR    2000-0076989 A    12/2000

* cited by examiner

Primary Examiner—Lin Ye
Assistant Examiner—Justin P Misleh
(74) Attorney, Agent, or Firm—Drinker Biddle & Reath LLP

(57) ABSTRACT

A digital camera is provided that includes an imaging device that takes a picture of a subject's image and generates an image signal, an image signal processor that performs predetermined conversion and compression processes on the image signal and generates digital image information, a storage device that stores the digital image information, a setting device that sets the resolution and compression ratio at which the image signal is processed by the image signal processor, and a control device that sends the resolution and compression ratio set by the setting device to the image signal processor. In the digital camera, the image signal processor changes either the resolution or compression ratio, or both, when the storage device has an insufficient space to store new images.

8 Claims, 5 Drawing Sheets

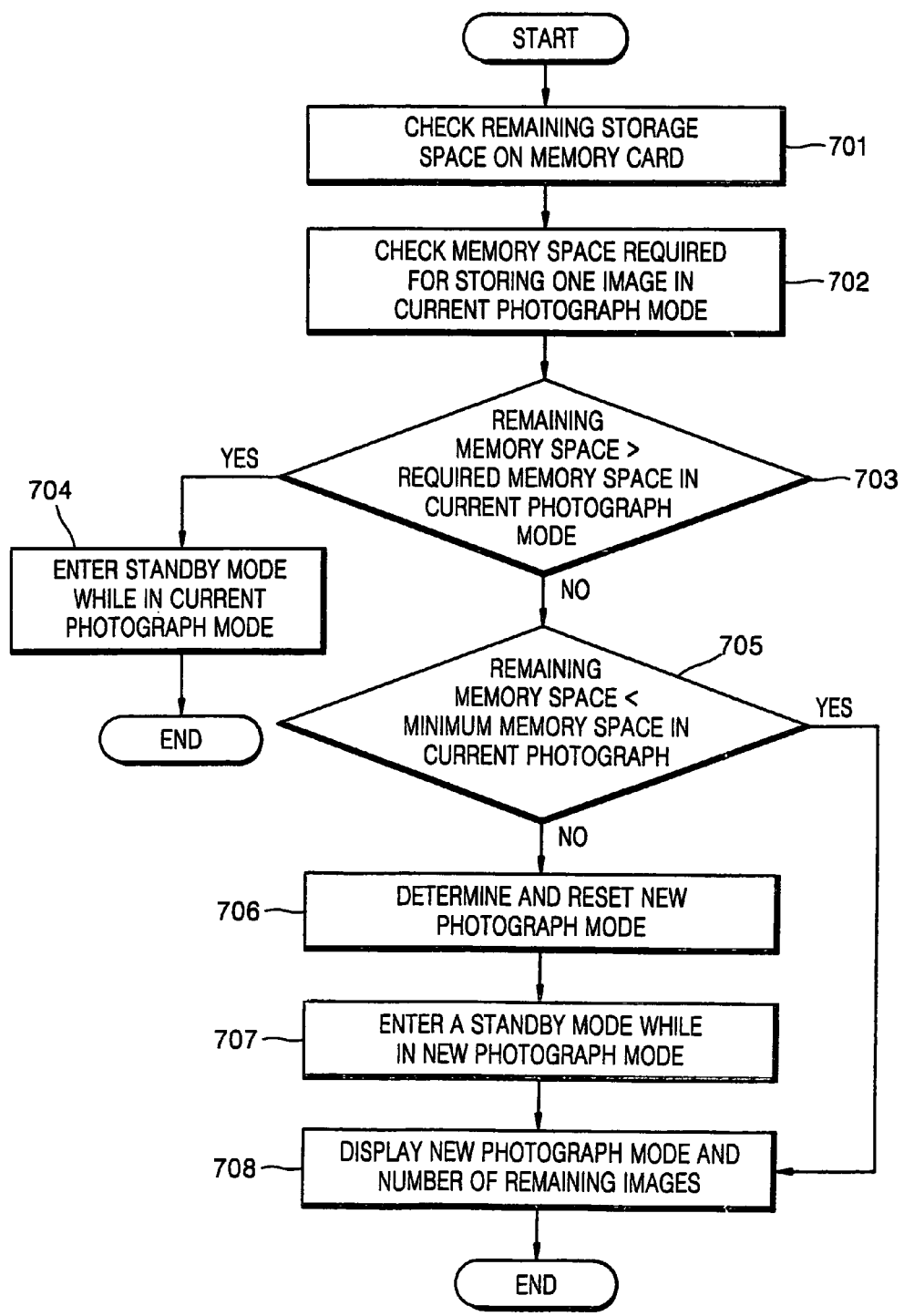

DIGITAL CAMERA AND METHOD FOR SAVING DIGITAL IMAGE

This application claims priority to Korean Patent Application No. 2002-67394, filed Nov. 1, 2002, the contents of which are incorporated herein by reference in their entirety.

FIELD OF THE INVENTION

The present invention relates to a digital camera that can modify the size of a stored digital image, and more particularly, to a method for saving a digital image in a storage space that is capable of storing more images by reducing the size of a stored digital image through adjustment of the resolution and compression ratio of the stored digital image when the storage space is insufficient.

BACKGROUND OF THE INVENTION

Digital images obtained by image acquisition devices such as a digital camera are stored in a storage space, e.g., a non-volatile memory such as EEPROM, a memory card comprised of SDRAM, and backup battery. The storage space is so limited that if the acquired images exceed a predetermined amount, additional images cannot be stored until the previously stored images are erased.

In order to save as many images as possible in a limited storage space, the image captured must undergo data conversion and compression processes before being stored in a memory card. In this case, the size of stored image can vary depending on its resolution and compression ratio.

However, an increase in compression ratio increases the memory size but results in loss of data compared to the original image. Thus, as the compression ratio increases, it is more unlikely to faithfully restore the original image when recovering the compressed image data for display on a display screen.

To troubleshoot this problem, a typical digital camera is designed for a user to set the resolution and compression ratio according to the number of images that can be stored in a limited storage space as well as the desired image quality.

Japanese Patent Publication No. Hei 8-262746 discloses a digital camera designed for a user to set and change the compression ratio of image data and indicate the number of remaining images yet to be photographed according to the changed compression ratio.

One conventional approach which changes the number of additional images that can be photographed if a storage space is not enough is for the user to directly adjust the resolution or compression ratio of an image through a menu or button. However, this method has a problem of not acquiring an image when it is needed immediately. Another approach involves temporarily storing a captured image in a temporary storage device such as an integrated circuit (IC) memory, reducing the amount of image data in the IC memory, and saving the image on a storage device. However, it also has the drawback of requiring a great deal of time in photographing an image.

SUMMARY OF THE INVENTION

The present invention provides a digital camera and method for saving a digital image in a storage space that is capable of storing more images by reducing the size of a stored digital image through adjustment of the resolution and compression ratio of the digital image when the storage space is insufficient.

Another aspect of the present invention provides a digital camera containing an imaging device that photographs a subject's image and generates an image signal, the image signal processor performing predetermined conversion and compression processes on the image signal and generating digital image information, a storage device that stores the digital image information, a setting device that sets the resolution and compression ratio at which the image signal is processed by the image signal processor, and a control device that sends the resolution and compression ratio set by the setting device to the image signal processor. In the digital camera, the image signal processor changes either the resolution or compression ratio, or both, when the storage device has an insufficient space to store new images.

The digital camera of the present invention may further include a display device that displays information about the number of remaining images that can be stored on the storage device and the resolution and compression ratio of the images saved on the storage device.

A further aspect of the present invention provides a method for saving images in a digital camera. The method is comprised of the steps of: determining whether a free space for storing images remains on the storage device; determining the amount of space required for storing one image at the current resolution and compression ratio; comparing the size of the remaining storage space with that of the required storage space; entering a standby mode so that the images can be taken at the current resolution and compression ratio if the remaining storage space is larger than the required storage space; determining a new resolution and compression ratio at which an additional image can be stored on the remaining space if the required storage space is larger than the remaining storage space; determining and resetting the new resolution and compression ratio; and entering a standby mode so that the additional image can be taken after automatically changing the current resolution and compression ratio to the new resolution and compression ratio.

The method may further include the step of displaying the number of remaining images that can be stored on the storage device as well as information about the resolution and compression ratio of the images stored on the storage device.

In the resetting step, the new resolution and the compression ratio are the highest possible resolution and the lowest possible compression ratio which will allow the additional image to be saved on the remaining storage space.

The digital camera and method for saving digital image according to the present invention can photograph more images by shrinking the size of a stored digital image through automatic adjustment of resolution and compression ratio of the stored image. The present invention also enables a user to check the amount of image data that can be additionally stored as well as the newly adjusted resolution and compression ratio through the display device. Thus, the present invention offers the best possible image quality within a range of the newly adjustable resolution and compression ratios.

BRIEF DESCRIPTION OF THE DRAWINGS

The present invention will become more apparent by describing in detail preferred embodiments thereof with reference to the attached drawings.

FIG. 7 is a flowchart showing a method of saving a digital image when the digital camera of FIG. 1 has an insufficient storage space according to an embodiment of this invention.

DETAILED DESCRIPTION OF THE INVENTION

Figure 1:
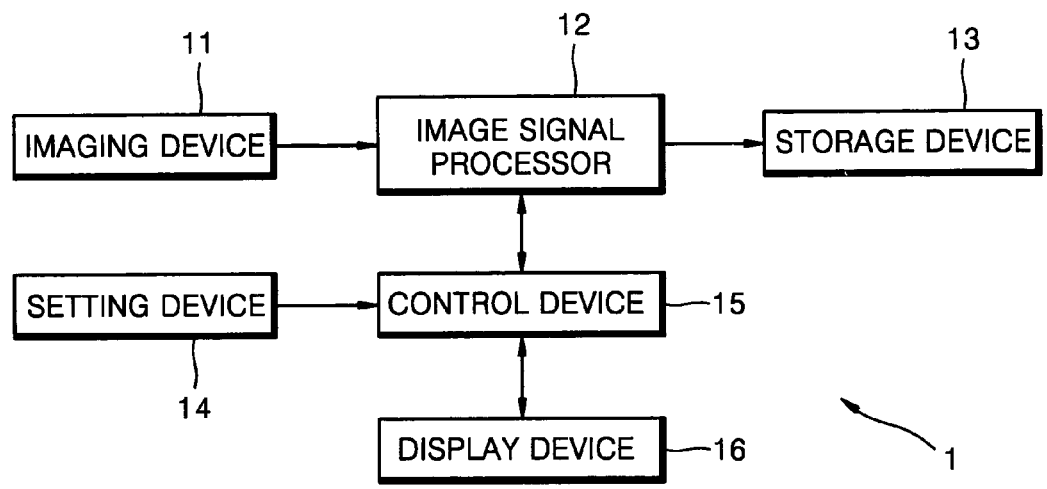
FIG. 1 is a block diagram showing the configuration of a digital camera according to an embodiment of the present invention.

Referring to FIG. 1, a digital camera according to an embodiment of this invention is designed to save additional digital images when its storage space is insufficient and comprises an imaging device 11, an image signal processor 12, a storage device 13, a setting device 14, and a control device 15. Preferably, the digital camera may further include a display device 16.

The imaging device 11 takes a picture of a subject's image and generates an image signal. The image signal processor 12 performs predetermined conversion and compression processes on the image signal and generates digital image information. Specifically, the image signal processor 12 compares the remaining storage space of the storage device 13 with the storage space required for saving new images, and if the former is larger the latter, processes the image signal at the current resolution and compression ratio. However, if the required storage space is larger than the remaining storage space, the image signal processor 12 processes the signal at a resolution and compression ratio that is automatically changed so that the new images can be saved on the remaining storage space. In this case, either the resolution or the compression ratio, or both, can be automatically changed according to a given condition.

The storage device 13 stores the digital image information, and the setting device 14 sets the resolution and compression ratio at which the signal is processed by the image signal processor 12. The control device 15 sends the resolution and compression ratio to the image signal processor 12. The display device 16 indicates the number of remaining images yet to be stored as well as the resolution and compression ratio of the image stored in the storage device 13.

Figure 2:
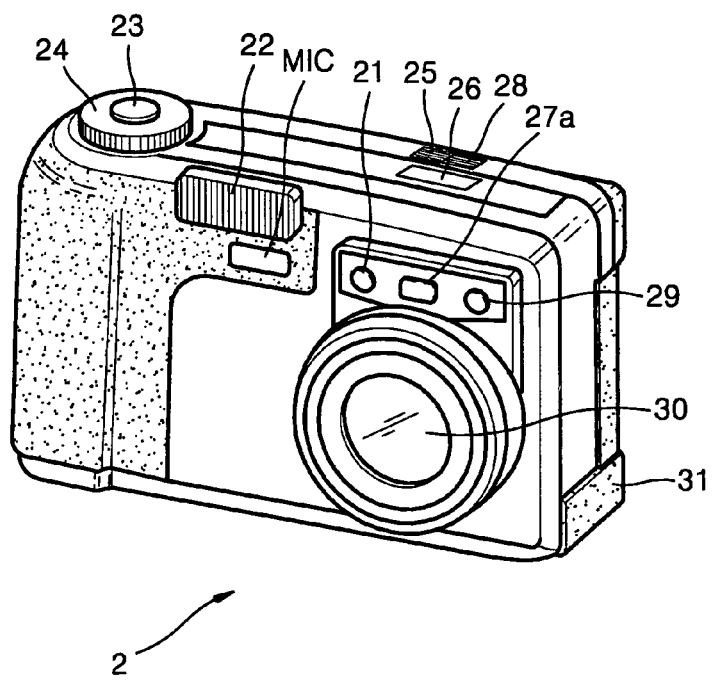
FIG. 2 is a front perspective view of the specific embodiment of the digital camera of FIG. 1.
Figure 3:
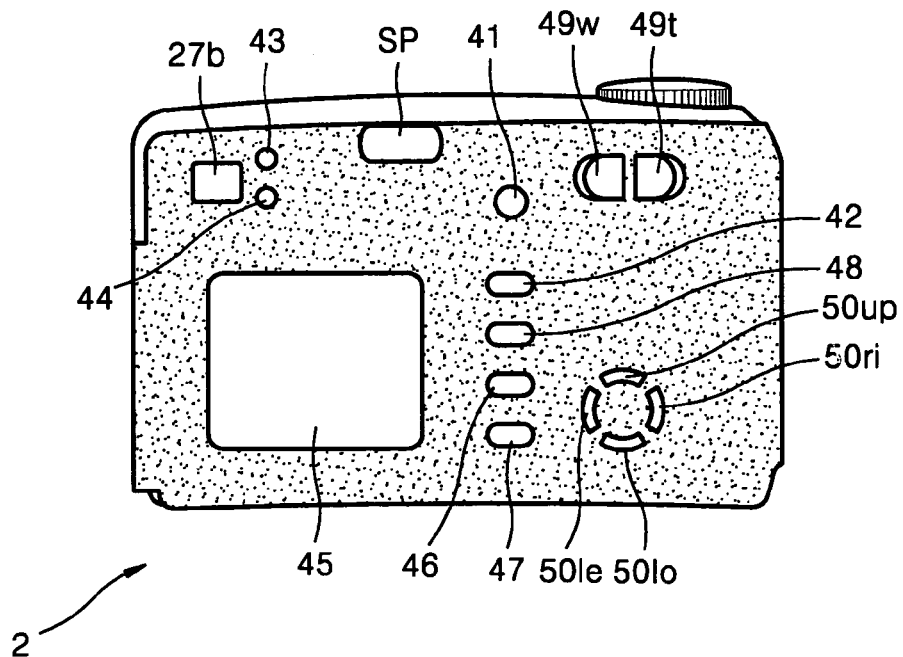
FIG. 3 is a rear view of the digital camera of FIG. 2.

The digital camera of FIG. 1 according to the present invention will now be described through a specific embodiment thereof shown in FIGS. 2-5. FIG. 2 is a front perspective view of the specific embodiment of the digital camera of FIG. 1, and FIG. 3 is a rear view of the digital camera of FIG. 2.

Referring to FIG. 2, on the front of a digital camera 2 are a self-timer lamp 21, a flash 22, a shutter button 23, a mode dial 24, a function-selection button 25, an information display 26, a viewfinder 27a, a function-block button 28, a flash-intensity sensor 29, a lens 30, an external interface 31, and a microphone (MIC).

The self-timer lamp 21 operates for a preset time, ranging from when the shutter button 23 is pressed to when a shutter operates. The mode dial 24 allows a user to choose or set various modes such as still, night shot, video, playback, computer connect, and system setup modes.

The function selection button 25 allows the user to select a variety of operation modes such as still, night shot, video, playback, computer connect, and system setup modes. The information display 26 indicates various information associated with taking pictures, which are well-known in the art.

The function-block button 28 allows the user to select each function displayed on the information display 26.

Referring to FIG. 3, the rear view of the digital camera 2 includes a power button 41, a monitor button 42, an auto-focus lamp 43, a viewfinder 27b, a flash standby lamp 44, a display panel 45, a confirm/delete button 46, an enter/play button 47, a menu button 48, a wide angle-zoom button 49w, a telephoto-zoom button 49t, an upper side button 50up, a right side button 50ri, a lower side button 50lo, a left side button 50le, and a speaker SP.

The monitor button 42 allows the user to control the operation of the display panel 45. For example, the monitor button 42 is pressed once to display the image of a subject and the associated information on the display panel 45. The monitor button 42 is pressed twice to display only the subject's image or pressed three times to power the display panel 45 off. The auto-focus lamp 43 fires when the subject is in focus. The flash standby lamp 44 emits light when the flash 22 is in a standby mode. The confirm/delete button 46 allows the user to confirm or delete the setting for each mode, and the enter/play button 47 allows the user to enter data or to stop or play a function while in a playback mode. The menu button 48 is used to display a menu for the mode selected by turning the mode dial 24. The upper side, right side, lower side, and left side buttons 50up, 50ri, 50lo, and 50le set each mode.

Figure 4:
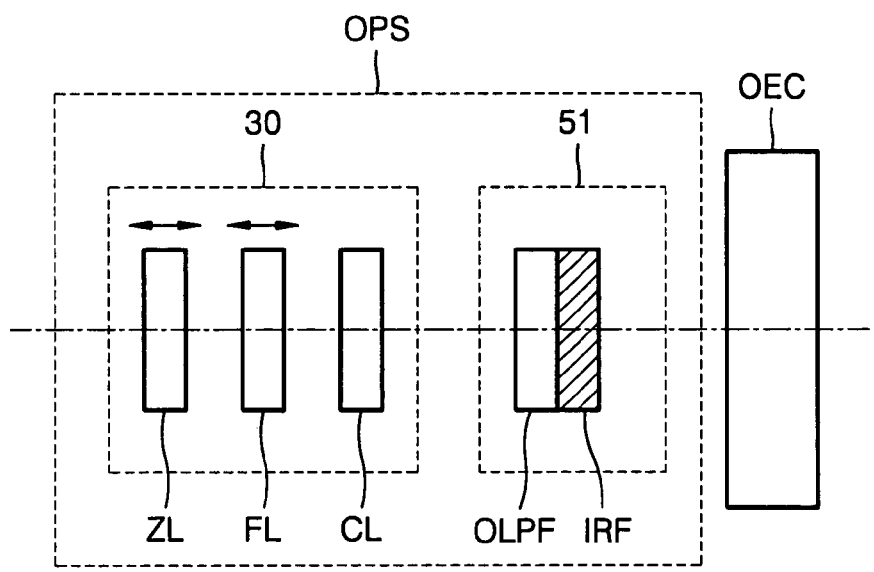
FIG. 4 shows the configuration of an imaging device in the digital camera of FIG. 2.
Figure 5:
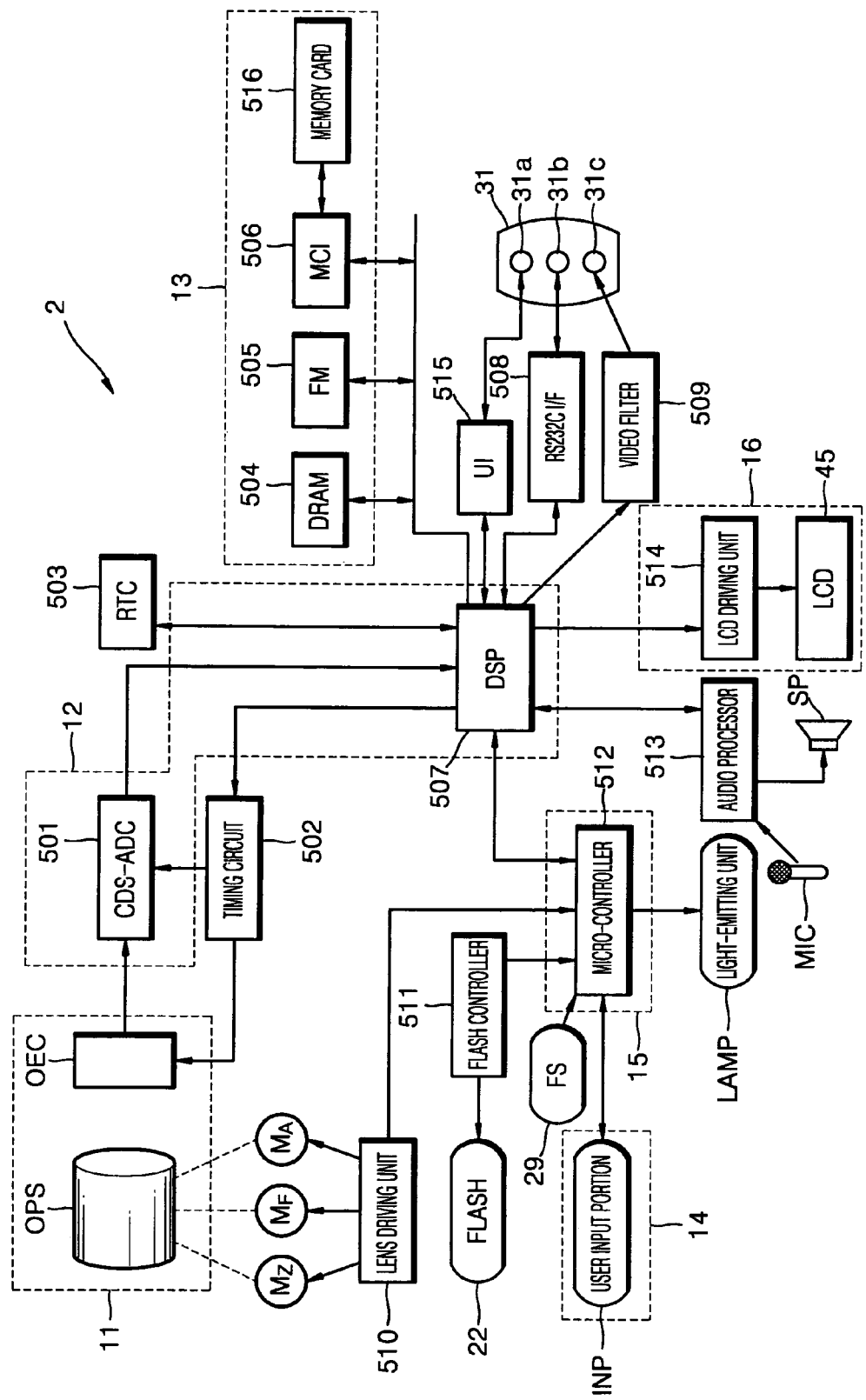
FIG. 5 is a block diagram showing the entire configuration of the digital camera of FIG. 2.

FIG. 4 shows the configuration of the imaging device 11 in the digital camera 2 of FIG. 2, and FIG. 5 is a block diagram showing the overall configuration of the digital camera 2 of FIG. 2.

Referring to FIGS. 4 and 5, the digital camera 2 is comprised of an imaging device 11, an image signal processor 12, a storage device 13, a setting device 14, a control device 15, a display device 16, and other devices required for supporting various features of the digital camera 2.

The imaging device 11 consists of an optical system (OPS) and an optoelectric conversion section (OEC) including a charge coupled device (CCD) or a complementary metal-oxide-semiconductor (CMOS). The image signal processor 12 is comprised of a correlation double sampler and analog-to-digital converter (CDS-ADC) 501 that performs analog-to-digital conversion and a digital signal processor (DSP) 507. The storage device 13 includes a dynamic random access memory (DRAM) 504, an electrically erasable programmable read only memory (EEPROM) 505, and a memory card interface (MCI) 506. The setting device 14 is constructed of a user input portion (INP) that includes the shutter button 23, mode dial 24, function-selection button 25, function-block button 28, monitor button 42, confirm/delete button 46, enter/play button 47, menu button 48, wide angle-zoom button 49w, telephoto-zoom button 49t, upper side button 50up, right side button 50ri, lower side button 50lo, and left side button 50le.

The control device 15 is comprised of a micro-controller 512, and the display device 16 consists of the information display 26, an LCD driving unit 514, and an LCD 45.

The other devices required for supporting various features of the digital camera 2 include lens driving motors $M_Z$, $M_F$, and $M_A$, a lens driving unit 510, a flash controller 511, a flash 22, a flash-intensity sensor 29, a light-emitting unit LAMP, an audio processor 513, a microphone MIC, a speaker SP, a Universal Serial Bus interface (UI) 515, a RS232C I/F 508, a video filter 509, and a connector unit 31. The connector unit 31 is comprised of a USB connector 31a, a RS 232C connector 21b, and a video output portion 21c.

The imaging device 11 includes the OPS and OEC. In this case, the OPS comprises a lens unit 30 and a filter unit 51 that optically processes an image of a subject formed through the lens unit 30 using the filter unit 51. The OEC comprises a CCD or CMOS and converts the light from the OPS to an electric analog signal. The lens unit 30 of the OPS includes a zoom lens ZL, focusing lens FL, and a compensating lens CL. The filter unit 51 includes a optical low pass filter (OLPF) that eliminates high frequency optical noise, and a infra-red cut filter (IRF) that filters out infrared component of the incident light.

The image signal processor is comprised of the CDS-ADC 501 that performs analog-to-digital conversion and the DSP 507. The CDS-ADC 501 processes the analog signal received from the OEC by removing high frequency noise from and adjusting the amplitude of the signal and converts the analog signal to a digital signal. The DSP 507 processes the digital signal received from the CDS-ADC 501 according to a preset resolution, separates the processed digital signal into luminance and chrominance signals, compresses the two signals at a predetermined compression ratio, and produces the compressed digital image data. The resolution and compression ratio are externally set by the user and can be changed as desired. The size of a digital image to be saved in the storage device 13 varies depending on the preset resolution and compression ratio.

The resolution refers to the degree to which the fine detail of a subject can be reproduced in a TV or picture, and is classified into horizontal and vertical resolutions. A digital camera segregates the image to be captured into a grid of unit regions (pixels) corresponding to the number of horizontal pixels by the number of vertical pixels and converts the image into image signal values assigned for each pixel that the digital camera can store.

As the resolution increases, the quality of image increases since the image is resolved more finely into pixels so more information about each pixel can be obtained. However, a higher resolution increases the amount of screen information saved so a larger storage area is required in the storage device 13.

The compression process performed by the DSP 507 may be implemented in various ways by either hardware or software. The Joint Photographic Experts Group (JPEG) Color Still Image Compression Standard can be used on images of various resolutions intended for low-resolution display or high-resolution printer. A JEPG image compression technique using lossy (as opposed to loss-less), irreversible coding based on discrete cosine transform (DCT) involves dividing the input digital image signal into eight by eight pixel blocks, performing DCT operation on each block, quantifying the DCT transformed image signal, coding the quantified data using a Hoffmann encoder, and producing the compressed image. In this case, a table in which the different luminance and color quantified coefficients are stored is used to quantify the incoming image signal. The size of the compressed image can be adjusted by controlling a scan operation of the Hoffmann encoder or adjusting each coefficient in the table.

The amount of image data or the number of images that can be stored in the storage device 13 can vary depending on the compression mode chosen to compress the digital image signal. That is, while a compression mode in which the compression ratio is high increases the number of images that can be stored in the storage device 13, a compression mode in which the compression ratio is low decreases the number of images that can be stored. However, selection of a compression mode in which the compression ratio is high in order to increase the number of images that can be stored causes a significant loss of the original image information when outputting the image stored in the store device 13, as a photo or play back, which in turn may decrease the quality of the image compared with the original image.

In an embodiment of the present invention, the digital image signal is compressed using one of three compression modes, i.e., fine, normal, and economic. If the user selects a fine mode, the better image quality can be achieved than in a normal mode since the compression ratio of the fine mode is lower than that of the normal mode. In an economic mode the quality of image is poorer when reproduced than in the normal mode since the compression ratio of the economic mode is higher than that of the normal mode. However, since a human eye has a limit for distinguishing the difference in image quality, various compression techniques currently available provide sufficiently good image quality despite a high compression ratio.

The image signal processor 12 compares the remaining storage space of the storage device 13 with the storage space required for saving new images, and if the former is larger than the latter, processes the image signal and converts and compresses it at the current resolution and compression ratio. However, if the required storage space is larger than the remaining storage space, the image signal processor 12 processes the signal, automatically changing the resolution and compression ratio to store the new images in the remaining storage space. In this case, either the resolution or compression ratio, or both, can be automatically changed according to a given condition.

The storage device 13 stores the digital image data, and the setting device 14 sets the resolution and compression ratio at which the signal is processed by the image signal processor 12. The control device 15 sends the resolution and compression ratio to the image signal processor 12. The display device 16 indicates the number of remaining images yet to be stored as well as the resolution and compression ratio of the image stored in the storage device 13.

The DSP 507 sends a digital image signal to the LCD driving unit 514 so that the image can be displayed on the LCD 45. That is, the DSP 507 may send the digital image signal using serial communication through the UI 515 and its connector 31a or the RS232C I/F 508 and its connector 31b, or send the signal as a video signal through the video filter 509 and video output portion 31c. The audio processor 513 outputs an audio signal from the MIC to the DSP 507 or SP. The DSP 507 controls a timing circuit 502 in order to control the operation of the OEC and the CDS-ADC 501. The DSP 507 conducts various operations as described above using a clock signal output from a real-time clock (RTC) 503.

The storage device 13 comprises the DRAM 504, EEPROM 505, and MCI 506 that stores the compressed digital image information.

While the DRAM 504, used as a temporary storage element, temporarily stores the compressed digital image signal output from the DSP 507, the EEPROM 505, which is a non-volatile storage element, stores algorithms and setup data required for the operation of the DSP 507. A user's memory card 516, which can be inserted into or removed from the MCI 506, stores the compressed digital image information. For the memory card 516, a storage element such as a portable compact flash card, smart media, and memory stick is employed.

Since the memory card 516 has a limited storage space, only a limited number of images can be stored according to the preset resolution and compression ratio. However, even if it is impossible to store additional images captured at the current resolution and compression ratio, there is still a space available for storing more images whose sizes are smaller than those captured at the current resolution and compression ratio. Thus, it may be possible to store more images processed at such resolution and compression ratios that the amount of information per image is less than the storage space currently available.

The setting device 14 sets the resolution and compression ratio at which the image signal is processed in the image signal processor 12 by allowing the user to externally manipulate a button, dial, or switch. In addition to the resolution and compression ratio, the setting device 14 can set a flash mode, exposure mode, or timer.

The control device 15 comprises a micro-controller 512 that detects the status of each switch and performs sequence control of a camera.

The light-emitting unit LAMP driven by the micro-controller 512 includes the self-timer lamp 21, the auto-focus lamp 43, and the flash standby lamp 44. The micro-controller 512 controls the operation of the flash controller 512 according to a signal generated by the flash-intensity sensor 44 while driving the flash 22. Furthermore, the zoom motor $M_Z$, focus motor $M_F$, and aperture driving motor $M_A$, are propelled according to the control of the lens driving unit 510 by the micro-controller 512 to drive the zoom lens ZL, the focusing lens FL, and an aperture (not shown), respectively. Furthermore, the micro-controller 512 sends the resolution and compression ratio set by the setting device 14 to the image signal processor 12.

The display device 16, such as liquid crystal display (LCD), provides information on the camera status to the user. The display device 16 may be a LCD 45 for displaying the image information, or the information display 26 may comprise a separate auxiliary LCD for showing the information on the digital camera 2.

If the display device 16 is implemented with the LCD 45, it is very easy to manipulate. That is, the user is able to directly access the internal information of the digital camera without the information display 26 being constructed on a separate auxiliary LCD and change the settings for the digital camera 2 while viewing an image.

Figure 6:
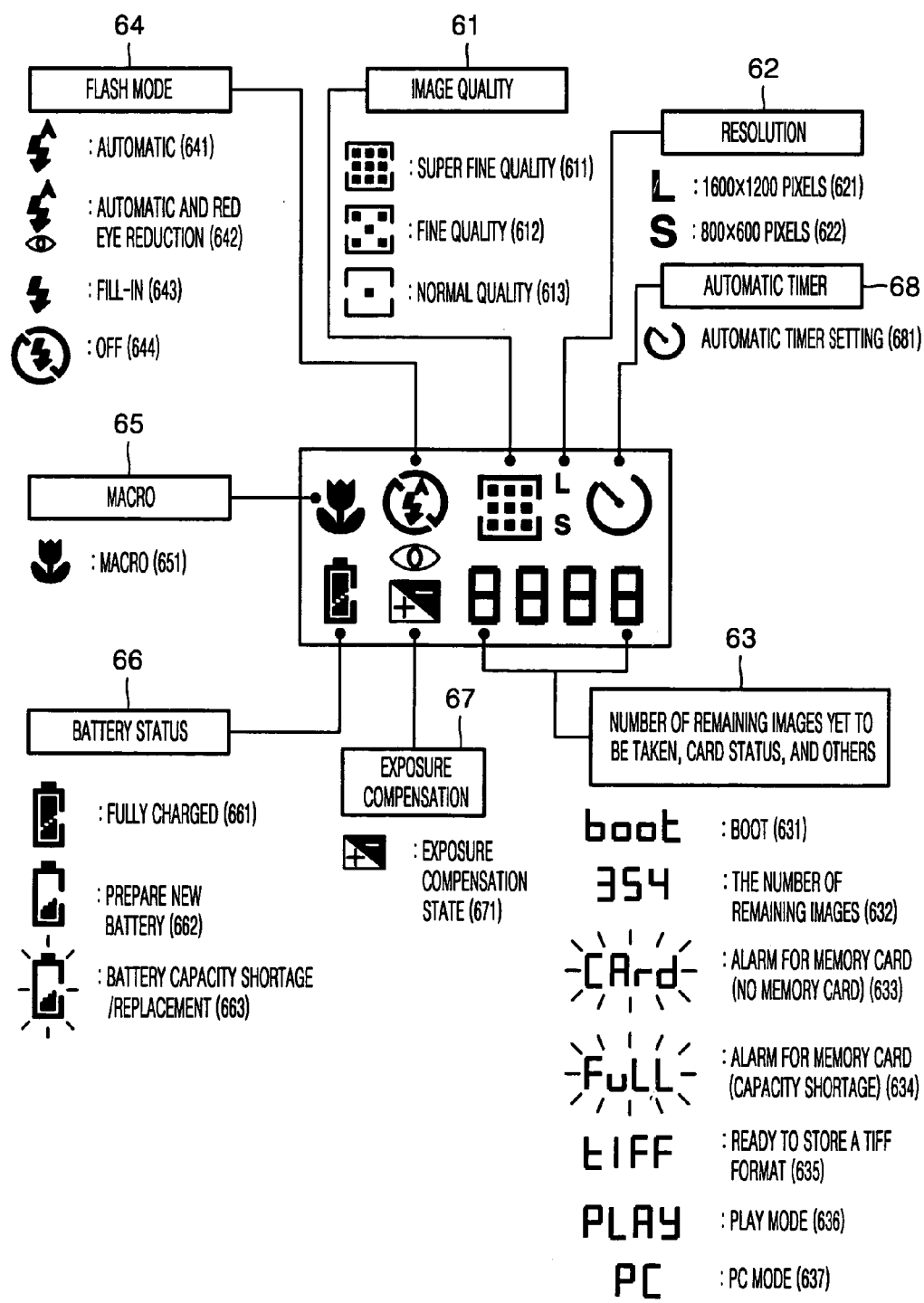
FIG. 6 shows an example of the display device of the digital camera of FIG. 1.

FIG. 6 shows an example of the display device 16 of the digital camera 1 using an information display constructed from an auxiliary LCD.

The display device 16 shows information about an image quality 61, a resolution 62, the number of remaining images yet to be taken, card status, and others 63, a flash mode 64, a macro 65, a battery status 66, an exposure compensation 67, and an automatic timer 68.

The image quality 61 displays one of super fine quality 611, fine quality 612, and normal quality 613. The resolution 62 displays a high resolution L 621 of 1600×1200 pixels and a low resolution S 622 of 800×600 pixels. The number of remaining images yet to be taken, card status, and other 63 displays a boot 631, the number of remaining images 632, alarm for no memory card 633, alarm for shortage of memory card capacity 634, ready to store a TIFF format 635, a play mode 636, and a PC mode 637

Furthermore, automatic 641, automatic and red eye reduction 642, fill-in 643, and off 644 is displayed in the flash mode 64. The macro 65 can display a macro indication 651.

The battery status 66 displays one of fully charged 661, rechargeable battery ready for use 662, battery capacity shortage and replacement 683. The exposure compensation 67 may display an exposure compensation state 671, and the automatic timer 68 may display an automatic timer setting 681. This enables the user to directly select settings, such as an image quality or resolution while viewing them through the display device 16 and check on any changes that have been made to those settings.

The image quality depends on the particular compression ratio selected by the user; the digital image signal that has undergone a predetermined image is compressed as earlier described in the compression process that is performed by the image signal processor 12. That is, if the user selects fine, normal, or economic as a compression mode, the image quality may be set to super fine, fine, or normal, respectively.

In particular, the display device 16 indicates information about the number of remaining images that can be additionally stored in the storage device 13 and the resolution/compression ratio of the images stored in the storage device 13. The number of remaining images is determined by the amount of data contained in each image stored in the storage device 13 according to the resolution and compression ratio of the image.

A digital camera typically acquires high quality image data if the preset resolution is high since the high resolution means the image can be resolved into pixels so finely as to obtain more information about the image. However, the high resolution also increases the amount of acquired image information stored in the storage space of the memory card 516 which reduces the number of images that can be additionally stored. Thus, obtaining the high image quality and resolution necessitates the reduction in the number of remaining images. However, since a human eye has a limit for distinguishing the difference in image quality, it is possible to achieve image reproduction of sufficiently practical quality despite the high compression ratio. For this reason, taking into account the given condition and usage, the user needs to choose between the desired quality and resolution of image information and the number of images that can be stored.

In one embodiment, a 2 million pixel digital camera with an 8 MB memory card supports two resolution modes (high resolution Large of 1600×1200 and low resolution Small of 800×600) and three image quality modes that vary depending on compression ratio (Super fine quality, fine quality, and normal quality). Thus, the digital camera may have six photograph modes according to the combinations of resolution and image quality. The number of images that can be stored in the memory card 516 varies, depending on the user's choices.

TABLE 1

|  | Super fine quality (Average file size per photo) | Fine quality (Average file size per photo) | Normal quality (Average file size per photo) |
|---|---|---|---|
| High resolution (Large) 1600 × 1200 | Photograph mode 1 6 ± 1 photos (1.3 Mb) | Photograph mode 2 14 ± 1 photos (0.57 Mb) | Photograph mode 3 22 ± 1 photos (0.36 Mb) |
| Low resolution (Small) 800 × 600 | Photograph mode 4 28 ± 2 photos (0.29 Mb) | Photograph mode 5 59 ± 3 photos (0.14 Mb) | Photograph mode 6 87 ± 6 photos (0.09 Mb) |

Table 1 shows six photograph modes created by combinations of the image quality and resolution as described in this embodiment as well as the number of digital photos and average file size per photo.

In principle, the average file size per photo is derived by dividing the memory size of 8 MB by the average number of photos taken. The file size per photo may vary depending on various conditions such as the degree of complexity of images, contrast and illumination. The number of photos that can be stored in a memory card varies depending on the file size per photo.

In the photograph mode 1 where high resolution (1600× 1200) and super fine quality are selected, 6±1 digital images can be saved in the memory card 516, and the average file size per photo is 1.3 MB.

In the photograph mode 2 where high resolution (1600× 1200) and fine quality are selected, 14±1 digital images can be saved in the memory card 516, and the average file size per photo is 0.57 MB.

In the photograph mode 3 where high resolution (1600× 1200) and normal quality are selected, 22±1 digital images can be saved in the memory card 516, and the average file size per photo is 0.36 MB.

In the photograph mode 4 where low resolution (800× 600) and super fine quality are selected, 28±2 digital images can be saved in the memory card 516, and the average file size per photo is 0.29 MB.

In the photograph mode 5 where low resolution (800× 600) and fine quality are selected, 59±3 digital images can be saved in the memory card 516, and the average file size per photo is 0.14 MB.

In the photograph mode 6 where low resolution (800× 600) and normal quality are selected, 87±6 digital images can be saved in the memory card 516, and the average file size per photo is 0.09 MB.

Thus, the user can choose one of those photograph modes based on the number of images that the user desires to capture on the memory card and their image quality.

Even if no more images can be stored in the current photograph mode, it is possible to acquire additional images within the storage space remaining in the memory card 516 under a photograph mode where the average file size per photo is smaller than that in the current photograph mode, Thus, if there is no space available for taking additional pictures in the current photograph mode, the photograph mode is automatically changed to a standby mode without the user's manual operation. This enables the control device 15 to acquire additional images.

As described above, this invention is aimed at acquiring additional images by changing the current photograph mode when the storage space is insufficient. There may be various other operations to do so. For example, if no more images can be acquired in the current photograph mode but the user desires to take additional pictures; the current photograph mode may be automatically changed to a photograph mode that takes up less storage space than the current mode.

FIG. 7 is a flowchart a flowchart showing a method of saving a digital image when the digital camera 1 of FIG. 1 has an insufficient storage space according to an embodiment of this invention.

Referring to FIG. 7, the method is comprised of the steps of checking remaining memory space (step 701), checking the required memory space (step 702), comparing the remaining space with the required space (step 703), entering a standby mode (step 704), inspecting for new resolution and compression settings (step 705), resetting the current resolution and compression ratio to new ones, and entering a standby mode (step 707). Preferably, the method may further include the step of displaying information about the camera's status (step 708).

Specifically, in step 701, a check is made to determine whether free space remains on the storage device 13. In the step 702, a check is made to determine the space required for storing one image under the current resolution and compression setting. In the step 703, the remaining storage space is compared with the required storage space. If the remaining storage space is larger than the required storage space, the digital camera 1 enters a standby mode so that the image can be taken at the current resolution and compression ratio in step 704. In contrast, if the required storage space is larger than the remaining storage space, the digital camera 1 searches for a new resolution and compression ratio at which an additional image can be stored on the remaining space in step 705. In step 706, the new resolution and compression ratio is determined for resetting, and in step 707 the digital camera enters a standby mode after automatically changing the current resolution and compression ratio to the new ones. In step 708, the number of remaining images that can be stored on the storage device 13 as well as information about the resolution and compression ratio is displayed.

In an embodiment of the present invention, after a photo is taken in the current photograph mode or when a photograph mode is reset by changing the resolution and image quality through the setting device 14, the display device 16 indicates the number of the remaining images 632 that can be taken.

In step 701, the control device 15 checks through the MCI 506 to determine how much space remains for storing the compressed digital images on the memory card 516. Then, in step 702, the control device 15 calculates the storage space on the memory card 516 required to store one image that has undergone predetermined signal processing and compression in a photograph mode selected by the current resolution and image quality and checks the required space per additional image.

The next step 703 is to compare the size of the remaining storage space checked in step 701 with that of the required storage space calculated in step 702. As a result of the comparison, if the remaining storage space is larger than the required storage space in step 704, a standby mode is entered so that an additional image can be stored in the photograph mode selected by the current resolution and compression settings. After step 704, the process for performing this method is completed.

If the required storage space is larger than the remaining storage space, then in step 705, it is determined whether there is any photograph mode having an average file size per photo smaller than the remaining storage space. That is, the determination is made to check for a new resolution and compression ratio at which the additional image can be saved in the remaining storage space.

In this case, if there is no photograph mode the average file size per photo smaller than the remaining storage space, then the process proceeds to step 708 where the number of remaining images 632 is indicated as '0' by the display device 16. Thereafter, the process for performing this method is completed. Otherwise, if there is a photograph mode supporting the average file size per photo smaller than the remaining storage space, the process proceeds to the next step 706 in order to change the current resolution and compression ratio to new settings for the new photograph mode.

In step 706, in order to achieve the best possible image quality, the photograph mode must have the highest possible resolution and the lowest possible compression ratio to the extent that an additional image can be saved on the remaining storage space. Also, it is possible for the user to reset the resolution and compression ratio to have a photograph mode supporting a smaller average file size per photo through the setting device 14.

The next step 707 is to enter a standby mode so that the additional image can be taken in the photograph mode selected by the new resolution and compression ratio. Then, in step 708, the display device 16 displays the number of remaining photos 632 that can be taken and resolution and compression selected by the new photograph mode where the additional image can be stored on the storage device 13. In this embodiment, one image quality is selected among the super fine quality 611, the fine quality 612, and the normal quality 613 corresponding to the fine, normal, economic modes, respectively, and indicated on the display device 16. Thereafter, the process for performing this method is completed.

According to an embodiment of the present invention, the method for storing an additional digital image when the storage space in the digital camera is insufficient is performed mostly by the DSP 507 in the image signal processor 12. Alternatively, this method may be performed by the micro-controller 512 of the control device 15.

As described above, the digital camera and method for saving additional images when the digital camera has an insufficient storage space, making it possible to acquire an additional image when the storage space is insufficient, comprises automatically adjusting the resolution and compression ratio in such a way as to reduce the size of digital images.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A digital camera comprising:
   a storage space having a storage capacity;
   a digital image file residing in the storage space, the digital image file being created at a first time and having a first file size; and
   a means for saving in the storage space an additional digital image file created at a second time after the first time and having a second file size that is expected to be greater than a difference between the storage capacity and the first file size, wherein the means for saving at the second time reduces only the second file size of the additional digital image file by adjusting one or both of a resolution of the additional digital image file to be less than a currently-set resolution and a compression ratio of the additional digital image file to be greater than a currently-set compression ratio.

2. The digital camera of claim 1, wherein the digital camera further comprises a setting device that cooperates with the means for saving prompting a user to select which one or both of the resolution and the compression ratio of the additional digital image file are to be adjusted.

3. The digital camera of claim 1, further comprising a display means that displays information about a number of images that can be stored in the storage space according to at least one resolution that is less than the currently-set resolution and according to at least one compression ratio that is greater than the currently-set compression ratio.

4. A digital camera comprising:
   an imaging means that captures a subject's image and generates an image signal;
   an image signal processing means that performs predetermined conversion and compression processes on the image signal for generating a digital image file;
   a storage means that stores the digital image file, the storage means having a storage capacity;
   a setting means that allows a user to set a resolution and a compression ratio at which the image signal is processed by the image signal processing means;
   a control means that sends the resolution and the compression ratio set by the setting means to the image signal processing means; and
   a means for determining a difference between the storage capacity and a file size of the image file, and for comparing the difference with an expected file size of a newly-captured image,
   wherein the means for determining controls the image signal processing means to change one or both of the resolution and the compression ratio set by the setting means for only the newly-captured image when the expected file size is greater than the difference.

5. The digital camera of claim 4, further comprising a display means that displays information about the number of remaining images that can be stored on the storage means and resolution and compression ratio of the images saved on the storage means.

6. A method for saving images in a digital camera including a storage means, the method comprising:
   capturing an image at a first time;
   processing the image to generate an image file having a file size;
   storing the image file to the storage means;
   capturing an additional image at a second time after the first time;
   determining, at the second time, an available storage capacity of the storage means;
   comparing the available storage capacity with an expected file size of an additional image file corresponding to the additional image;
   according to the comparing step, automatically adjusting only the expected file size of the additional image to be a reduced file size that is less than or equal to the available storage capacity;
   processing the additional image to generate the additional image file having the reduced file size; and
   storing the additional image file to the storage means.

7. The method of claim 6 wherein the comparing step comprises:
   determining the expected file size according to a resolution that is set at the second time and a compression ratio that is set at the second time; and
   determining a difference between the available storage capacity and the expected file size.

8. The method of claim 7 wherein the automatically adjusting step comprises:
   determining which one or both of the resolution and the compression ratio that is set at the second time is to be changed; and
   changing one or both of the resolution and the compression ratio that is set at the second time.

* * * * *